United States Patent

[11] 3,557,857

| [72] | Inventor | Henry F. Swenson |
| | | 22 Homehill Lane, Roseland, N.J. 07068 |
| [21] | Appl. No. | 784,434 |
| [22] | Filed | Dec. 17, 1968 |
| [45] | Patented | Jan. 26, 1971 |

[54] T-NUTS
4 Claims, 6 Drawing Figs.

[52] U.S. Cl. .................................................. 151/20, 151/37
[51] Int. Cl. .................................................. F16b 39/22, F16b 39/282
[50] Field of Search .................................... 151/20, 37; 85/32

[56] References Cited
UNITED STATES PATENTS

| 1,387,085 | 8/1921 | Whippey | 151/20 |
| 1,633,295 | 6/1927 | Sutherland et al. | 85/32X |
| 2,191,613 | 2/1940 | Ericsson | 151/37 |
| 3,456,549 | 7/1969 | Horton | 85/32 |

*Primary Examiner*—Edward C. Allen
*Attorney*—Ralph R. Roberts

ABSTRACT: A T-nut for use in slots of machine tool tables and the like includes a threaded hole disposed at an angle to the upper surfaces of the extending wings of the T-nut. The upper surfaces of the extending wings of the T-nut are provided with toothed or knurled surfaces to insure that the engaged surface does not slide in the T-grooves of the worktable when the T-nut is tightened against this groove.

PATENTED JAN 26 1971

3,557,857

INVENTOR.
HENRY F. SWENSON
BY Ralph R Roberts
AGENT

T-NUTS

BACKGROUND OF THE INVENTION

1. Field of the Invention

The field of art to which this invention pertains is generally found in the class described as driven, headed and screw-threaded fastenings and in particular to the subclass directed to "nuts".

2. Description of the Prior Art

The use of T-nuts in combination with clamps for holding workpieces on machine tool tables and the like is well known in the art. These T-nuts are characterized as having extending wing portions which are disposed to engage the undersurface of a T-slot formed in the worktable of the machine tool. With the increasing dependency upon the T-nut to retain the clamping member in a fixed position upon the worktable, it has become necessary to increase the holding power of the T-nut in the T-slot and in cooperation with the clamping member. Conventional T-nuts have their threaded aperture disposed so that its axis is normal to the engaging or upper surface of the wing portions of the T-nut, which engaging surfaces of the T-nut are normally made as a cast or machined surface having a defined plane. Accordingly, when the workpiece is clamped to the table by means of a clamping member, T-nut and bolt, the tightening of the bolt draws the T-nut into retaining engagement with the T-slot. In the absence of a determined tension which is immediately increased upon the application of a load, a conventional T-nut may allow the workpiece to slide a small amount upon the worktable.

It is an object of this invention to provide a T-nut whereby the tightening of the bolt will provide a tensioning force which is immediately increased upon the application of a load or thrust so as to greatly reduce the possibility of slippage. In addition, the engaging surfaces on the upper portions of the extending wing members of the T-nut are provided with a multiplicity of projections disposed to engage the undersurface of the T-slots formed in the worktable.

SUMMARY OF THE INVENTION

The T-nut of this invention is of a generally conventional configuration. This T-nut is provided with a threaded hole whose axis, instead of being normal to the plane of the engaging surfaces of the extending wings of the T-nut, is disposed at an angle of approximately 6° from a vertical to the plane of the engaging surface. As thus disposed and after the bolt is tightened, any applied force causing a tendency of the clamping member to be dislodged from its mounted position only increases the tension of the bolt which reduces the probability of the T-nut to slide in the T-slot. In addition, the upper surfaces or edges of the wing portions of the T-nut are provided with a knurled or serrated surface to provide slightly raised tooth portions which, as the T-nut is tightened, provide additional frictional engaging means with the surface of the T-slot thus greatly increasing the coefficient of friction between the T-nut upper engaging surface and the mating undersurface of the T-slot.

INTENT OF THE DISCLOSURE

Although the following disclosure offered for public dissemination is detailed to insure adequacy and aid in understanding of the invention, this is not intended to prejudice that purpose of a patent which is to cover the inventive concept therein no matter how it may later be disguised by variations in form or additions of further improvements. The claims at the end hereof are intended as the chief aid toward this purpose, as it is these that meet the requirement of pointing out the improvements in which the inventive concept is found.

There has been chosen a specific embodiment of the T-nut and modification thereof as adopted for use in T-slots of machine tool worktables. This specific embodiment and alternate embodiment thereof have been chosen for the purposes of illustration and description as shown in the accompanying drawing wherein:

BRIEF DESCRIPTION OF THE DRAWING

In the following description and in the claims various details will be identified by specific names for convenience: these names, however, are intended to be generic in their application. Corresponding reference characters refer to like members throughout the several figures of the drawing.

Figure 2:
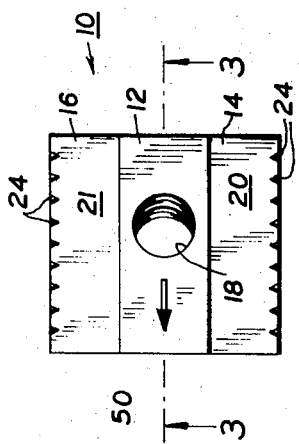
FIG. 2 represents a plan view of the T-nut of FIG. 1.

The drawing accompanying, and forming part of, this specification discloses certain details of construction for the purpose of explanation of the broader aspects of the invention, but it should be understood that structural details may be modified in various respects without departure from the concept and principles of the invention.

DESCRIPTION OF THE PREFERRED EMBODIMENT

Referring now to FIGS. 1, 2, 3 and 4, there is shown a T-nut generally indicated as 10 wherein a body or stem portion 12 has extending therefrom oppositely disposed wing members 14 and 16. These wing members have their upper surfaces generally laying in the same plane and with the stem portion forms a T-section which may be slidably mounted in a T-slot formed in a worktable of machine tool not shown. At least one portion of the stem and/or wing portions have a longitudinal surface disposed to engage a portion of the T-slot so as to prevent turning of the T-nut in the T-slot.

Figure 3:
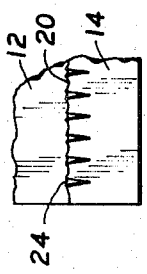
FIG. 3 represents a sectional view of the T-nut of FIG. 1, the view taken on the line 3—3 of FIG. 2.

As seen particularly in FIG. 3, there extends through the body 12 a threaded hole 18, which hole is disposed at an angle of about 6° to the upper surfaces 20 and 21 of the wing portions 14 and 16. This threaded hole is of any determined selected size but its gross thread diameter is generally about two-thirds to three-quarters of the width or thickness of the stem portion 12 of the T-nut. Formed in the outer edges of the wing portions 14 and 16 are serrations or nicks 24 which may be formed in the metal body by means of a sharp tool. These serrations are generally provided on a regular spacing and as they, the nicks in the metal, are formed cause small toothlike portions to be raised above the surfaces 20 and 21. This is most clearly illustrated in FIG. 4.

It is contemplated that the T-nut 10 may be made out of a heat treatable steel wherein it is heat treated after the T-nut has been formed, as shown, and with the toothlike portions 24 formed in the edges so that the upstanding teeth portion 24 extend above the surfaces 20 and 21, an amount equal to about one sixty-fourth of an inch.

DESCRIPTION OF THE ALTERNATE EMBODIMENT OF FIGURES 5 AND 6

Figure 5:
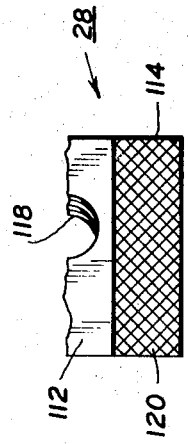
FIG. 5 represents a fragmentary plan view of a T-nut similar to that of FIG. 2 but whose extending wing portions have a knurled upper surface instead of a serrated edge.
Figure 6:
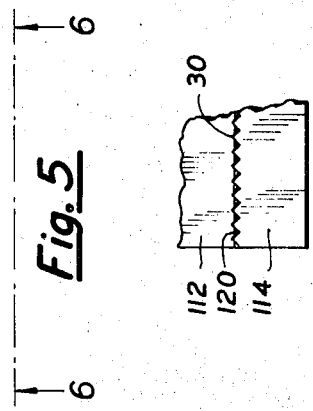
FIG. 6 represents a fragmentary side view of the wing portion of the T-nut and showing a portion of the upper surface, the view being taken on the line 6—6 of FIG. 5.
Figure 4:
FIG. 4 represents a fragmentary side view of the wing portion of the T-nut, the view generally taken on the line 4—4 of FIG. 2.
Figure 1:
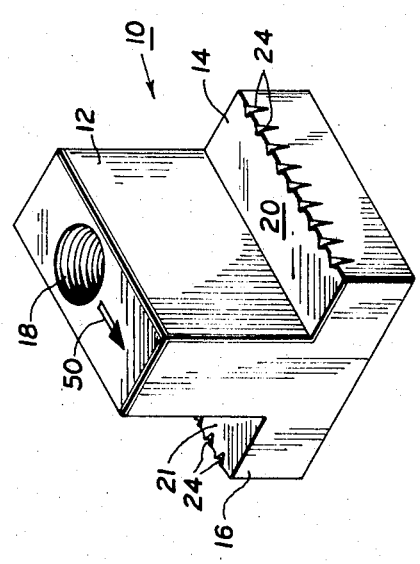
FIG. 1 represents an isometric view of the T-nut of this invention and showing in particular the extending wing portions with serrations formed in their upper outer edges to provide tooth protruding portions.

The T-nut of FIG. 1 in a modified version is shown in FIGS. 5 and 6 wherein a T-nut 28 has a stem portion 112 and shows one extending wing portion 114 having an upper surface 120 provided with a diamond-patterned knurl. This knurl is embossed or cast into this surface to provide small upstanding sharp edge portions 30, which are disposed to engage the undersurface of the T-slot when the T-nut 28 is tightened therein. The threaded hole 118 in body 112 is disposed at an angle of about 6° to the plane of surface 120 in the manner of the threaded hole in the T-nut of FIGS. 1 through 4. The T-nut 28, of course, has an opposite wing member, not shown, on the other side of the stem 112. Like wing member 114, it also has a knurled upper surface with like sharp edge portions 30. As in FIG. 1, the opposite wings have their upper surfaces lying in a common plane.

USE AND OPERATION

In the manner of conventional T-nuts, the T-nut 10 or 28 is adapted for mounting in a T-slot of a machine tool table and the like in the conventional manner. However, as the threaded hole 18 or 118 is disposed at a determined angle, it is desirable that the operator knows in which direction the threaded hole in the T-nut is slanted. Therefore, there is provided, on the upper portion of the stem 12 or 112, an arrow 50 which indicates the way the threaded hole is tilted. In use, as a bolt is inserted in the threaded hole 18 or 118 to draw a clamp member into position above the T-slot of the worktable and the bolt is tightened, the bolt is disposed at the determined tension or in a very tight condition, any further load as it is applied to a work strap held by the bolt in the threaded hole 18 or 118 increases the tension in the bolt. Unless the bolt is overstressed, the bolt accepts this increase in force without a sliding of the T-nut in the T-slot of a worktable. As thus mounted, the operator is assured that the bolt is not tilted forwardly of the vertical to the wing portions of the T-nut installation, whereby as a side thrust is applied to the work strap, the bolt may be caused to be moved backwards until it again is brought into thrust retaining tension. With the inclined thread and with a determined tension applied to the bolt, there is eliminated the possibility of the bolt being just slightly off the axis normal to the plane of the wing portions of the T-nut.

In the T-nut of this invention there is a deliberate tension developed in the bolt which can only be increased as a load or thrust is applied to the holding strap. As shown, the arrow 50 indicates the manner in which the counterthrust load is to be applied so that the tension in the bolt is only increased by a thrust or pushing of the strap in a dislodging action by means of the load upon the workpiece. The toothed portions 24 or the knurled surface teeth 30 as the T-nut is drawn tightly into engagement with the undersurface of the T-slot causes a slight imbedding of these protrusions or teeth into the undersurfaces of the slot so that any side thrust upon the T-nut is withstood by the greatly increased sliding friction developed by these surfaces as they engage undersurface of the T-slot.

The T-nuts as shown and described above and when drawn tightly into a T-slot of a worktable, have the engaged bolts disposed at a determined slight angle to the worktable surface and have the wing members with their high coefficient of friction surfaces in positive engagement with the undersurface of a T-slot. As reduced to practice, the T-nuts with such wing surfaces withstand at least three to five times as much thrust as a like-sized T-nut without the high friction surface. The inclined bolt insures that the high tension developed to lock the T-nut in the T-slot is maintained or increased with an added load and that a decrease in bolt tension does not occur with a thrust load.

In certain applications it may be desirable to form the threaded hole at a greater angle than the shown 3° to 6°. This greater angle may be, for example, 30° and such T-nuts are useful in combination with jaw clamp members wherein the jaw clamp holding action is to be a downward and inward thrust action. This greater angle is contemplated as not exceeding 45°, and any angle between 45° and the shown 6° is merely a matter of application and selection.

Terms such as "left", "right", "up", "down", "bottom", "top", "front", "back", "in", "out" and the like are applicable to the embodiments shown and described in conjunction with the drawing. These terms are merely for the purposes of description and do not necessarily apply to the position in which the T-nuts may be constructed or used.

The conception of the T-nut and its many application is not limited to the specific embodiments shown and protection is sought to the broadest extent the prior art allows.

I claim:

1. A T-nut for use in a mating T-slot of a worktable for a machine tool and the like, said T-nut including:
   a. a stem portion sized so as to slide in an open slot portion of the T-slot;
   b. a pair of wing members attached to and extending outwardly from the stem, the upper surfaces of the wing members formed so as to lie substantially in a common plane normal to said stem, the wing members in combination with the stem providing at least one longitudinal flat surface at right angles to the upper surface of the wing members and disposed to slidably engage a longitudinal surface of the T-slot so that the T-nut is restrained from being turned in the T-slot;
   c. a threaded hole of determined size formed in the stem, the axis of the hole lying in a plane generally parallel with said longitudinal surface of the T-nut and said axis being tilted at least 3° from a theoretical line normal to the plane of the upper surfaces of the wing members; and
   d. a multiplicity of at least partially pointed protrusions formed by nicking the upper outer edges of each wing member said pointed protrusions formed so as to be directed upwardly to lie substantially in a common plane extending above the plane of the upper surface of the wing portions, the protrusions provided at only the longitudinal outer edges of the wing members.

2. A T-nut as in claim 1 in which the stem is generally rectangular and is as long as the wing members; and wherein the outer edges of the wings are longitudinally disposed to slidably engage the enlarged portion of the T-slot.

3. A T-nut as in claim 1 in which the tilt of the axis of the threaded hole is at a selected angle of not less than 3° and not more than 30°.

4. A T-nut as in claim 1 in which indicating means is provided on said nut so as to indicate the direction of anticipated thrust; said direction disposed in relation to the tilt of the threaded hole so that a bolt when tightened therein will tend to be stretched when the thrust load is applied according to said indication.

PO-1050
(5/69)

UNITED STATES PATENT OFFICE
CERTIFICATE OF CORRECTION

Patent No. 3,557,857        Dated January 26th, 1971

Inventor(s) Henry F. Swenson

It is certified that error appears in the above-identified patent and that said Letters Patent are hereby corrected as shown below:

Col. 3, line 26, after "T-nut" insert --. A forward displacement may occur in a conventional T-nut --;

Col. 4, line 15, "application" should read -- application

Signed and sealed this 20th day of April 1971.

(SEAL)
Attest:

EDWARD M. FLETCHER, JR.                WILLIAM E. SCHUYLER, JR.
Attesting Officer                      Commissioner of Patents